United States Patent
Narasimhan et al.

(10) Patent No.: US 7,184,770 B1
(45) Date of Patent: Feb. 27, 2007

(54) SYSTEM AND METHOD FOR POSITIONING AND CALIBRATING WIRELESS NETWORK DEVICES

(75) Inventors: Partha Narasimhan, Santa Clara, CA (US); Pradeep Iyer, San Jose, CA (US); Steve Jung, Cupertino, CA (US); Deepinder Setia, San Jose, CA (US); Cedric Sellin, San Francisco, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 401 days.

(21) Appl. No.: 10/382,752

(22) Filed: Mar. 5, 2003

(51) Int. Cl.
*H04Q 7/20* (2006.01)
(52) U.S. Cl. .............. 455/446; 455/423; 455/67.11
(58) Field of Classification Search ............. 455/423, 455/67.11, 446, 422.1, 448, 449, 67.14, 67.15
See application file for complete search history.

(56) References Cited

U.S. PATENT DOCUMENTS

| | | | | |
|---|---|---|---|---|
| 6,094,580 A | * | 7/2000 | Yu et al. ................ | 455/446 |
| 6,141,552 A | * | 10/2000 | Sendonaris et al. ....... | 455/436 |
| 6,148,194 A | * | 11/2000 | Kao et al. ................ | 455/421 |
| 6,198,909 B1 | * | 3/2001 | Du ....................... | 455/67.11 |
| 6,317,599 B1 | * | 11/2001 | Rappaport et al. ........ | 455/446 |
| 6,587,690 B1 | * | 7/2003 | Di Huo et al. ........... | 455/446 |
| 6,615,040 B1 | * | 9/2003 | Benveniste .............. | 455/423 |
| 6,625,454 B1 | * | 9/2003 | Rappaport et al. ........ | 455/446 |
| 2002/0006799 A1 | * | 1/2002 | Rappaport et al. ........ | 455/446 |
| 2003/0017829 A1 | * | 1/2003 | Ching-Hsiang et al. ..... | 455/446 |
| 2003/0087641 A1 | * | 5/2003 | Gustafasson ............. | 455/446 |
| 2004/0038683 A1 | * | 2/2004 | Rappaport et al. ........ | 455/446 |
| 2004/0229623 A1 | * | 11/2004 | Rappaport et al. ........ | 455/446 |

\* cited by examiner

*Primary Examiner*—Lewis West
(74) *Attorney, Agent, or Firm*—Blakely Sokoloff Taylor & Zafman, LLP

(57) ABSTRACT

In an exemplary embodiment, a method comprising determining locations within a site for a plurality of network devices and calibrating the network devices by each of the plurality of network devices. The calibration of each network device is performed separately and successively through the transmission of wireless signals by the access points. The quality of these wireless as measured by test receivers are mapped to detect RF interference and to adjust power level or channel assignment as needed.

8 Claims, 6 Drawing Sheets

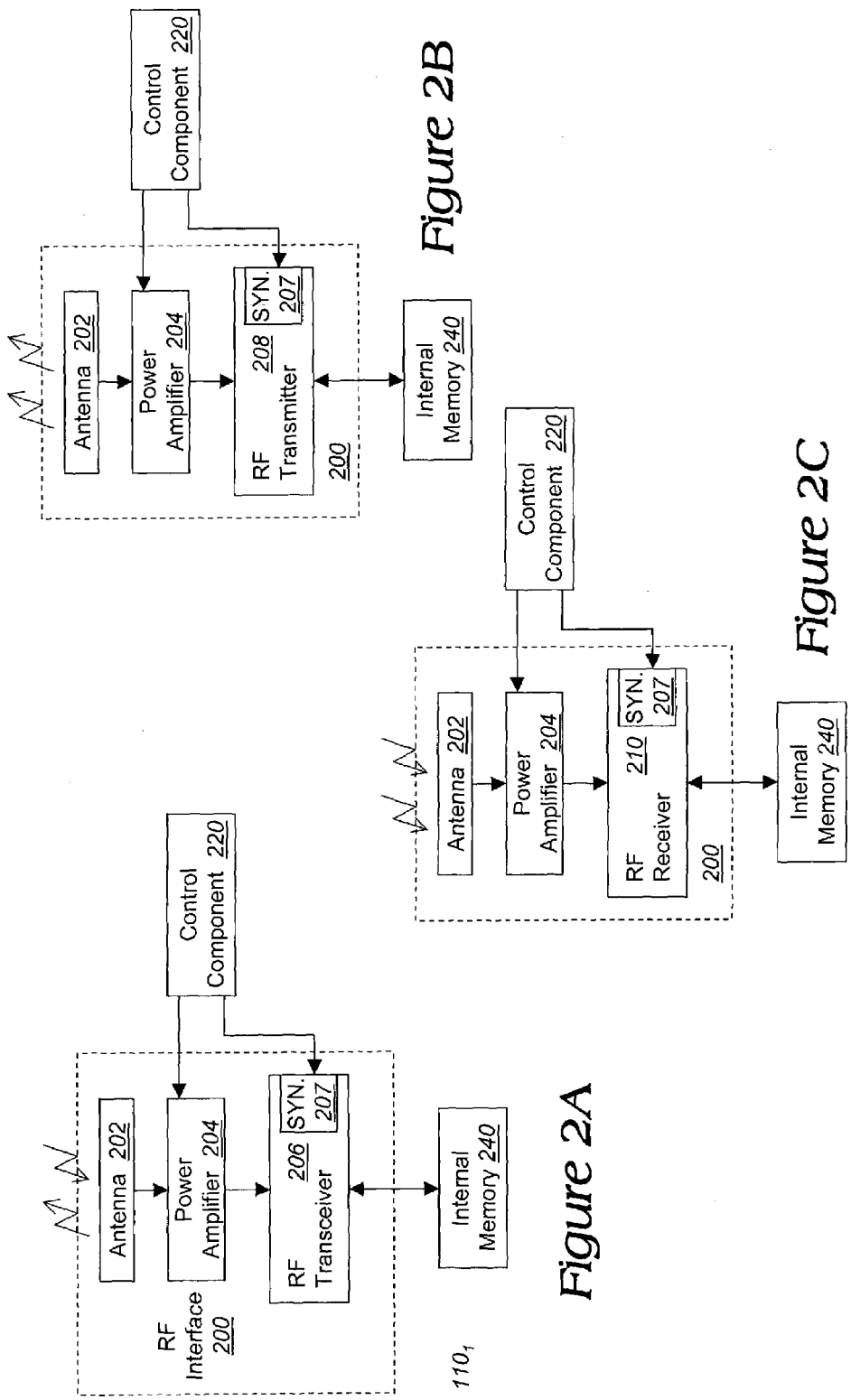

SYSTEM AND METHOD FOR POSITIONING AND CALIBRATING WIRELESS NETWORK DEVICES

FIELD

Embodiments of the invention relate to the field of wireless communications, in particular, to a system and method for positioning and automatically calibrating network devices forming a wireless network.

GENERAL BACKGROUND

Over the last decade or so, for most businesses, it has become a necessity for employees to share data over a network such as a local area network. To improve efficiency, enhancements have been added to local area networks such as remote wireless access. This enhancement provides an important extension in forming a wireless local area network (WLAN).

Typically, a WLAN supports communications between wireless stations and Access Points (APs) for example. In general, each AP operates as a relay station by supporting communications between wireless stations and other APs being part of a wireless network and resources on a wired network.

Currently, when a large WLAN is deployed, the usual procedure is to conduct an extensive site survey. A "site survey" involves a team of technicians, who are responsible for deploying and configuring the WLAN based on a fixed set of network requirements. The network requirements may involve traffic capacity, throughput (in megabits per. second), constraints on signal coverage, and the like. Based on chosen network requirements and the overall physical dimensions of the site, technicians estimate the number of APs that are required to cover the area of interest, where to locate these APs, and the channel that each AP should operate on.

More specifically, one or more APs are initially positioned at the site and complex radio frequency (RF) measurement tools are physically moved to various locations on the site to sample received wireless signals. This enables the technicians to better determine propagation characteristics for the site being surveyed in efforts to minimize dead spots and maximize coverage.

In addition, as APs are added and repositioned based on measured results from the RF measurement tools, power level and channel assignments are manually conducted for each AP. These assignments are designed to minimize interference caused by neighboring APs.

One disadvantage associated with conventional site survey techniques is that it is labor intensive, which tends to substantially increase the overall costs in deploying a WLAN. Another disadvantage is that site surveys can only be performed based on static network requirements, not dynamically. Slight changes to the network requirements after deployment of the WLAN would warrant another site survey to be conducted, which is highly disruptive to persons working at this location and fails to address situations in which an AP fails. Yet another disadvantage is that the location and power level/channel adjustments are not self-calibrating, namely performed automatically by the APs. Rather, conventional site surveys require physical maneuvering of signal measuring equipment.

BRIEF DESCRIPTION OF THE DRAWINGS

The invention may best be understood by referring to the following description and accompanying drawings that are used to illustrate embodiments of the invention.

FIGS. 2A–2C are exemplary embodiments of an Access Point of the WLAN of FIG. 1 in communication with a wireless station.

DETAILED DESCRIPTION

Figure 1:
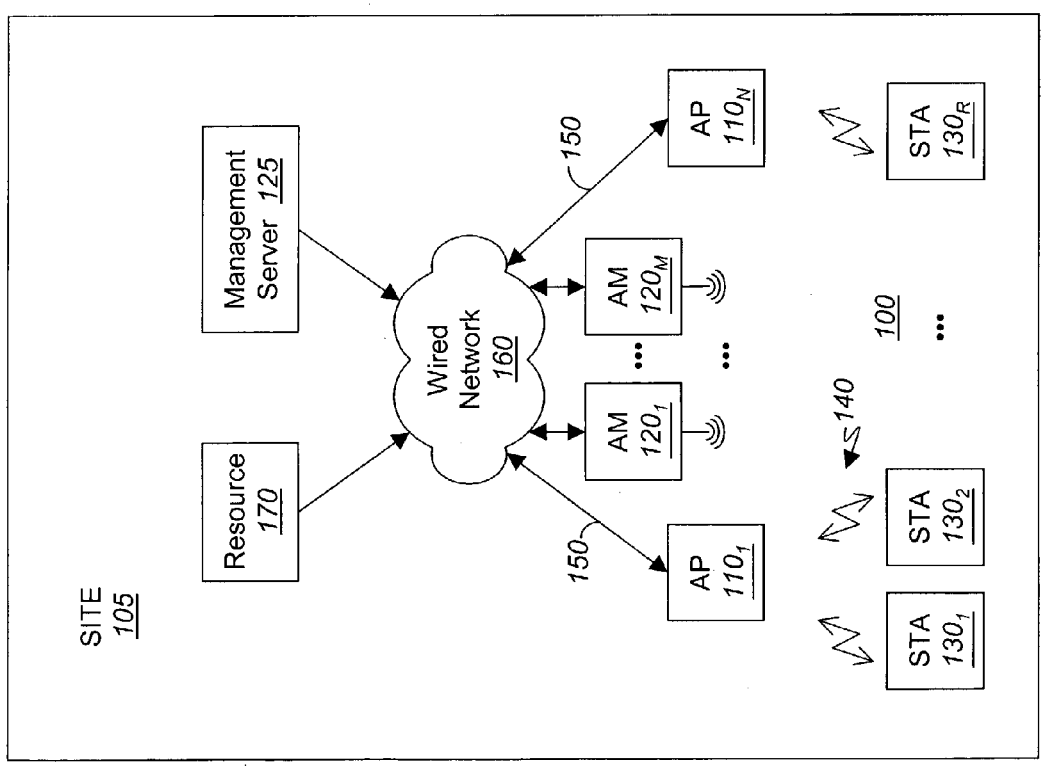
FIG. 1 is an exemplary embodiment of a wireless network configured by the invention.

In general, embodiments of the invention relate to a system and method for determining the placement of devices forming a wireless network without the need for a conventional site survey and for automatically calibrating the devices, without human assistance, by adjusting their power levels and channels of communication. These "network devices" may include, but are not limited or restricted to Access Points (APs), Air Monitors (AMs), or the like.

In general, as described below, one technique for positioning and calibrating network devices forming the wireless network comprises two processes. The first process involves determining optimal locations for network devices within a given site using a software modeling tool. Such computations are based on a variety of requirements supplied by the user. The second process involves calibrating the network devices after deployment. The calibration process is initiated to measure and map radio frequency (RF) interference between network devices if such devices were assigned the same channel and maintained at given power levels.

Herein, the invention may be applicable to a variety of wireless networks such as a wireless local area network (WLAN) or wireless personal area network (WPAN). The WLAN may be configured in accordance with any Institute of Electrical and Electronics Engineers (IEEE) 802.11 standard such as (i) an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999), (ii) IEEE 802.11a standard entitled "Wireless LAN Medium Access Control (MAC) and Physical Layer (PHY) specifications: High-Speed Physical Layer in the 5 GHz Band" (IEEE 802.11a, 1999), (iii) a revised IEEE 802.11 standard "Wireless LAN Medium Access Control (MAC) and Physical Layer (PHY) specifications" (IEEE 802.11, 1999), or even (iv) an upcoming IEEE 802.11g standard. Of course, the invention may be compliant with systems configured in accordance with High Performance Radio Local Area Networks (HiperLAN) or subsequently published specifications.

Certain details are set forth below in order to provide a thorough understanding of various embodiments of the invention, albeit the invention may be practiced through many embodiments other that those illustrated. Well-known components and operations may not be set forth in detail in order to avoid unnecessarily obscuring this description.

In the following description, certain terminology is used to describe features of the invention. For example, a "component" represents hardware and/or software configured to perform one or more functions. For instance, examples of "hardware" include, but are not limited or restricted to an integrated circuit (e.g., microprocessor, application specific integrated circuit "ASIC", a digital signal processor "DSP", a micro-controller "MC"), a finite state machine, or even combinatorial logic.

An example of "software" includes executable code in the form of an operating system, an application, an applet, a routine or even a series of instructions. The software may be stored in any type of machine readable medium such as a programmable electronic circuit, a semiconductor memory device like volatile memory (e.g., random access memory, etc.) or non-volatile memory (e.g., any type of read-only memory ("ROM"), flash memory), a floppy diskette, an optical disk (e.g., compact disk or digital video disc "DVD"), a hard drive disk, tape, or the like. One software implementation is referred to as a software modeling tool, namely a combination of different routines each performing a desired function and collectively computing placement of one or more network devices within a proposed site. The software modeling tool is stored on a web browser running on a switch and is accessed using a web browser on any computer.

A "link" is generally defined as an information-carrying medium that establishes a communication pathway. Examples of the medium include a physical medium (e.g., electrical wire, optical fiber, cable, bus trace, etc.) or a wireless medium (e.g., air in combination with wireless signaling technology). "Information" is defined as data, address, control or any combination thereof.

I. General Architecture

Referring to FIG. 1, an exemplary embodiment of a network in accordance with the invention is illustrated. Herein, a wireless network 100 comprises one or more Access Points (APs) $110_1$–$110_N$ ($N \geq 1$) positioned at a site 105. The APs $110_1$–$110_N$ are in communication one or more wireless stations (STAs) $130_1$–$130_R$ ($R \geq 1$) over wireless links 140. As an optional configuration, one or more Air Monitors (AMs) $120_1$–$120_M$ ($M \geq 1$) may be implemented within wireless network 100, where communications between APs $110_1$–$110_N$ and STAs $130_1$–$130_R$ are being monitored by AMs $120_1$–$120_M$.

Management Server 125 features software that manages each and every AM installed in the network. Each Air Monitor (e.g., AM $120_1$) is configured with a server address and registers with Management Server 125 at start-up. Of course, for small scale deployment, functionality of Management Server 125 can be merged into AM $120_1$.

Each AP $110_1$, . . . , or $110_N$ enables information propagating over one type of medium to be placed onto another type of medium. For instance, AP 110, enables information propagating over a wireless link 140 to be placed onto a physical medium 150 as well as provides information propagating over the physical medium 150 to be placed onto wireless link 140.

As further shown in FIG. 1, each AP $110_1$, . . . , or $110_N$ is an electronic device that supports bi-directional communications by (i) receiving information from wireless network 100 and routing this information onto the physical medium 150 that forms part of a wired network 160 and (ii) receiving information from wired network 160 and routing such information as data frames to one or more targeted STAs $130_1$, . . . , $130_R$. Wired network 160 can be of any type of wired network, including but not limited or restricted to Ethernet, Token Ring, Asynchronous Transfer Mode (ATM) or the like. Moreover, wired network 160 features resources 170 that are available for users of wireless network 100. Such resources 170 may include devices for data storage, which are coupled to physical medium 150.

Referring still to FIG. 1, when implemented, each Air Monitor (e.g., AM $120_1$) constantly scans different frequency channels and maintains information about all APs $110_1$–$110_N$ and STAs $130_1$–$130_R$ in wireless network 100. Generally, AM $120_1$ monitors wireless network 100 to extract information from wireless frames in order to maintain the state of the wireless network 100.

Herein, STA 130, is a mobile communication device that processes information (e.g., computer, personal digital assistant "PDA", telephone, alphanumeric pager, etc.). STA 130, comprises a wireless transceiver, although it is contemplated that only a receiver (RX) or transmitter (TX) may be employed within STA $130_1$.

STA $130_1$ communicates with and accesses information from AP $110_1$ over the air in accordance with IEEE 802.11 communications protocol or another wireless networking protocol. Hence, AP $110_1$ generally operates as a transparent bridge connecting both a wireless network featuring STA $130_1$ with wired network 160.

Referring now to FIG. 2A, a first exemplary embodiment illustrating certain components of AP $110_1$ of FIG. 1 is shown. AP $110_1$ comprises a radio frequency (RF) interface 200, control component 220 and internal memory 240.

For one embodiment, RF interface 200 comprises an antenna 202, a power amplifier 204 and an RF transceiver 206. Power amplifier 204 can be adjusted by control component 220 so that components 202, 204, 206 collectively operate to transmit and receive signals at a selected power levels. RF transceiver 206 comprises a synthesizer 207 that can be tuned by control component 220 to select different channels. RF transceiver 206 may further comprise modulation and/or demodulation components as well as encoding and/or decoding components.

As shown in FIG. 2B, another embodiment of AP 1101 features RF interface 200 comprising antenna 202, power amplifier 204 and an RF transmitter 208. Collectively, these components merely transmit signals to one or more STAs $130_1$–$130_R$ of FIG. 1 so AP $110_1$ merely operates as a broadcast transmitter. Power level and channel adjustments are conducted by control component 220.

Yet in another embodiment, as shown in FIG. 2C, AP $110_1$ comprises an RF receiver 210 in lieu of RF transmitter 208 to operate merely as a monitoring unit and routing such information to resources 170 of FIG. 1. Power level and channel adjustments are similarly conducted by control component 220.

In the event that wired network 160 of FIG. 1 has a substantially larger data rate than wireless network 100, at least a portion of internal memory 240 within the AP $110_1$ may be configured as temporary storage. In one embodiment of the invention, internal memory 240 may be deployed as content addressable memory "CAM". Of course, internal memory 240 may be configured as any type of volatile or non-volatile memory.

Control component 220 is a component for generally adjusting and controlling the functionality of the AP $110_1$. For instance, control component 220 may be used to tune synthesizer 207 in order to adjust the channel over which information is received and/or transmitted. As one embodiment, control component 220 may be implemented as a processor (e.g., microprocessor, DSP, ASIC, MC, etc.) having access to stored contents of a non-volatile memory.

Additionally, control component 220 is responsible for adjusting the level of effective isotropic radiated power through adjusting current levels to power amplifier 204. This reduces or increases the coverage area by antenna 202. The adjustment in the power level may be in small incremental changes or may be made in accordance with given preset levels. For example, a first preset (low) level may set power amplifier 204 to provide a predetermined amount of milliwatts "mW" (e.g. less than 10 mW) while a second level may cause power amplifier 204 to provide power above 25 mW.

II. Software Modeling of a Wireless Network

A. Generating Virtual Layout of Site

Figures 3, 5:
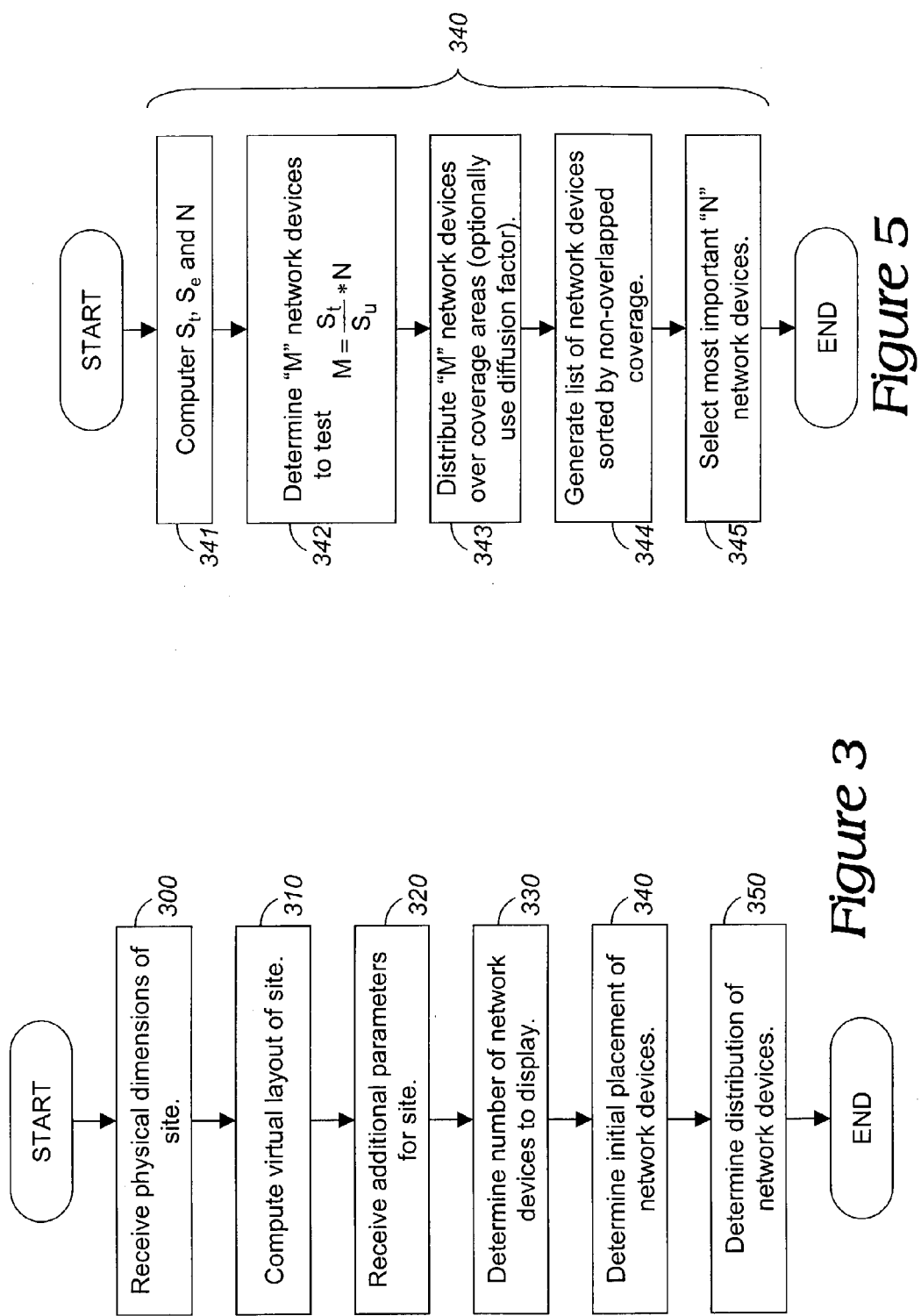
FIG. 3 is an exemplary embodiment illustrating the functionality of a software modeling tool for positioning network devices forming the wireless network of FIG. 1.
FIG. 5 is an exemplary embodiment of an AP placement process based on the software modeling tool of FIG. 3.

Referring now to FIG. 3, an exemplary flowchart of the functionality of a software modeling tool run on a computer for positioning network devices that form wireless network 100 of FIG. 1 is shown. Initially, physical dimensions of the site are acquired and provided to a software modeling tool in order to compute a virtual layout of the site being surveyed (blocks 300, 310). In one embodiment, the physical dimensions may be manually input by user input. Building schematics, such as a Computer Aided Design (CAD) drawing file or a Joint Photographic Experts Group (JPEG) image of a floor plan may be used as an input as well.

For instance, when the software modeling tool is employed at a central server, it is contemplated that the parameters associated with the physical dimensions may be entered by the user via a web-based graphic user interface (GUI). The "physical dimensions" may include, but are not limited or restricted to one or more of the following: (i) approximate dimensions of a single floor or one or more polygon-shaped areas over the floor based on a predetermined point of origin of the floor; (ii) distance between floors if the site features two or more floors; (iii) location(s) on each floor where no wireless coverage is needed; and (iv) location(s) on each floor where heightened coverage is desired. The physical dimensions may be in any selected unit of measure (e.g., meters, centimeters, yards, feet, inches, etc.).

Besides the physical dimensions of the site, additional parameters may be entered and provided to the software modeling tool to assist in production of proposed placement of network devices of the wireless network (block 320). As an example, these additional parameters comprise (i) type of building material, (ii) total number of users, (iii) desired association rate (minimum data transfer rate between user-controlled STAs and a network device), (iv) average bandwidth per user, (v) desired user density per network device, and (vi) type of IEEE 802 protocol(s) that will be deployed. It is contemplated that the invention may be implemented to account for any other parameters that would influence the proposed placement of network devices (e.g., APs and/or AMs) in the wireless network.

It is contemplated that the network of FIG. 1 may be deployed throughout one or more buildings, where each building features one or more floors and each floor comprises one or more areas that do not need coverage or need heightened coverage. Thus, the input can be associated with a particular floor within a building, all floors within a particular building, or all buildings within the network.

Based on the physical parameters and perhaps additional parameters, the software modeling tool automatically determines the placement of the network devices at each site (e.g., within each building within the network) as set forth in blocks 330–350.

B. Positioning Devices within a Wireless Network

1. Number of APs

Based on the characteristics of the site, the software modeling tool determines the number of network devices to deploy within the wireless network (block 330), the initial placement of network devices (block 340), and the amount of diffusion needed to generally position the network devices uniformly across the site (block 350).

Figure 4B:
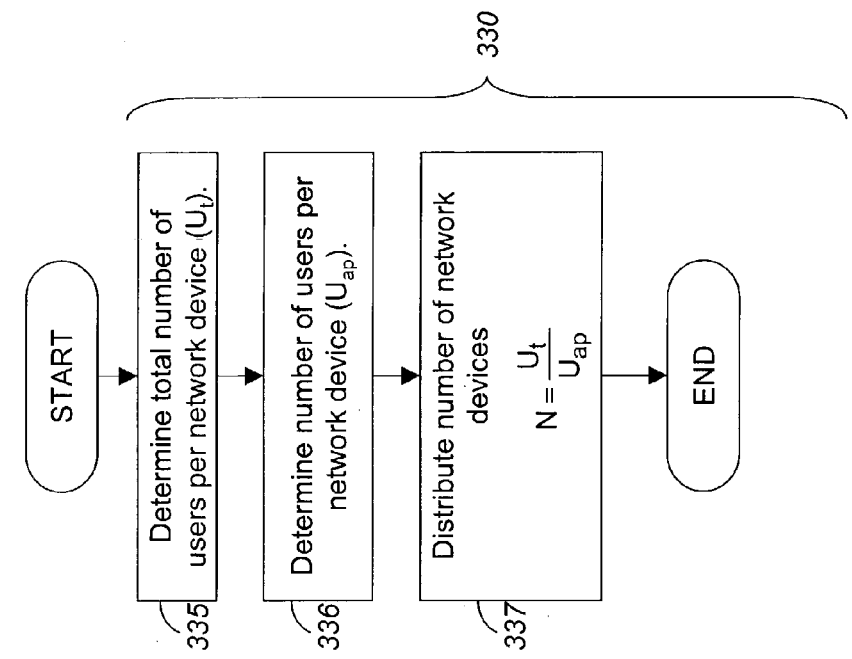
FIGS. 4A and 4B are exemplary embodiment of components of a software modeling tool for positioning network devices of the wireless network of FIG. 1.
Figure 4A:
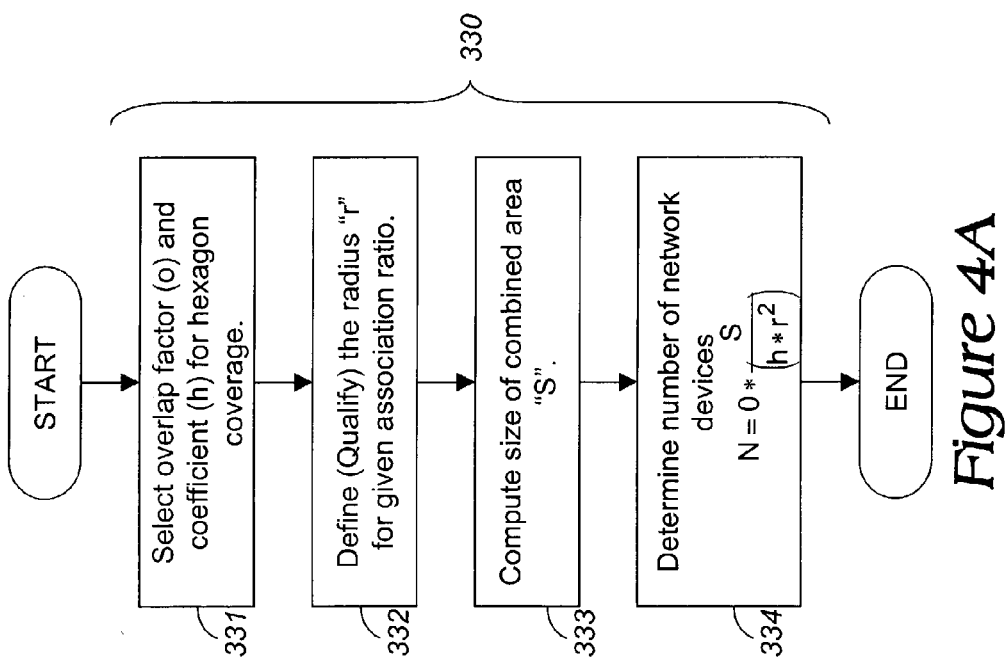

In order to determine how many network devices, such as APs for example, are employed within the wireless network, a number of techniques may be utilized as shown in FIGS. 4A–4B. For example, as shown in FIG. 4A, a desired association rate may be used to calculate the number of APs that need to be deployed (block 330). The radius "r" is a radial distance of coverage (in a measured unit) that is needed to achieve the desired association rate. The radius is precomputed (block 332) and the size of the floor or combination of areas is computed based on the dimension data being entered (block 333). Assuming an ideal hexagonal shaped coverage for a network device and a certain overlap factor between neighboring coverage areas have been determined for use (block 331), the number of network devices (N) to cover a given area is set forth in equation (1) and block 334.

$$N = o * s / (h * r^2), \text{ where} \tag{1}$$

h=coefficient for an approximation of hexagon coverage– h=2.59 in one embodiment, r=radius for given association rate, s=size of the combined area of the site being covered, and o=an overlap factor determined by user to ensure smooth transition from one coverage area to another ($o \geq 1$).

Alternatively, with respect to FIG. 4B, the number of network devices (N) may be determined based on the total number of users supported by the wireless network (block 335) and the desired number of users per network device (block 336). In particular, a ratio between the total number of users to be supported by the wireless network ($U_t$) and the number of users per network device ($U_{ap}$) as set forth in equation (2) may indicate the number (N) of network devices to deploy (block 337).

$$N = U_t / U_{ap}, \text{ where} \tag{2}$$

$U_t$=total number of users to support, and $U_{ap}$=number of users per network device Of course, although not shown, as a third alternative, the user can simply enter the desired number (N) of APs to deploy into the software modeling tool.

2. Initial Placement Algorithm

Where the site comprises multiple floors in close proximity to each other, it is contemplated that a network device from one floor may be used to communicate with STAs at another floor. Moreover, each floor may have areas where no coverage is desired or which are not to be part of the proposed site. In order to select an optimal location of a network device, a test of "M" numbers of network devices, where $M \geq N$ is conducted as set forth in equation (3) and blocks 341–345 of FIG. 5.

$$M = (N * S_t) / S_c, \text{ where} \tag{3}$$

N=number of network devices,

M=Number of network devices to test $S_t$=Size of a proposed site (building) including areas where no wireless coverage is needed, and $S_c$=size of areas to cover Initially, parameters $S_t$ and $S_c$ are determined by the characteristics of the proposed site. "N" may be computed as described above (block 341). The number of "test" network devices (M) is greater than the number of network devices for deployment by a factor $S_t/S_c$ (block 342). These "M" network devices are evenly distributed over the entire area of coverage (block 343) and the network devices are then sorted by non-overlapped coverage within desired areas of coverage, which inherently determines the importance of a corresponding network device (block 344). Then, the most important "N" network devices (N<M) are chosen based on their location (block 345).

The dampening (diffusion) factor (f) as set forth below in equation (4) is developed in efforts to more equally distribute the network devices across the site. Herein, for this embodiment, each network device functions as a particle with the same mass (Ma). And each wall, both bounding wall and wall of areas, functions as ambient attraction force, not a particle, with the same (Mb=Ma) or different mass (e.g., Mb≦Ma).

$$f=(K*Ma*Mb)/d^5, \text{ where} \qquad (4)$$

f=gravitational force,

K=constant which determines algorithm speed; for one embodiment, $10^{-10} \leq K \leq 10^{10}$, d=distance between network devices or network device and wall; for one embodiment, $2 \leq d \leq 10$, and Ma, Mb, are mass values for network devices; both are typically set to be "1", but different values can be applied in order to achieve better coverage (e.g., for more APs in an area, values is less than "1", $10^{-3} \leq Ma$, $Mb \leq 10^3$)

In this calculation, each and every network device or firewall is counted. If a network device is moved to a new location, the new position corresponds to a new force that is taken into account. This process continues until either user stops process or the site reaches equilibrium.

III. Calibration Process—Assignment of Channel & Power Levels

The calibration process assumes that the network devices (e.g., APs) have been deployed based on the number and locations suggested in the process above. The calibration process uses various devices deployed within the network devices as test points (hereinafter generally referred to as "test point receivers"). For instance, the APs can be configured to act as transmitters, while the test point receivers positioned at different locations will measure the quality of the signal from each deployed AP.

Herein, a "test point receiver" could be, but is not limited to an Air Monitor, handheld PDA with installed calibration software, or a standard laptop with installed calibration software. Moreover, it is possible to use a deployed AP as a test point receiver (i.e. the test point locations would coincide with the location of the APs, in this case).

Signals from an AP on one floor of a building can propagate to one or more of the neighboring floors. Hence, the calibration process is carried out over an entire building even though the network performance requirements may not be uniform in each floor of the building.

The unit of calibration is a building and a specific RF PHY type (for example, IEEE 802.11b, IEEE 802.11a, IEEE 802.11g, etc.). The devices that participate in the calibration process include all the APs in the selected building capable of operating in the selected PHY type, and all the test point receivers in the selected building that are capable of operating in the selected PHY type.

The calibration process is initiated at a user interface terminal (graphical or otherwise) connected to the Management Server 125 as described in U.S. patent application Ser. No. 10/254,125 filed Sep. 24, 2002, which is incorporated by reference.

Figure 6:
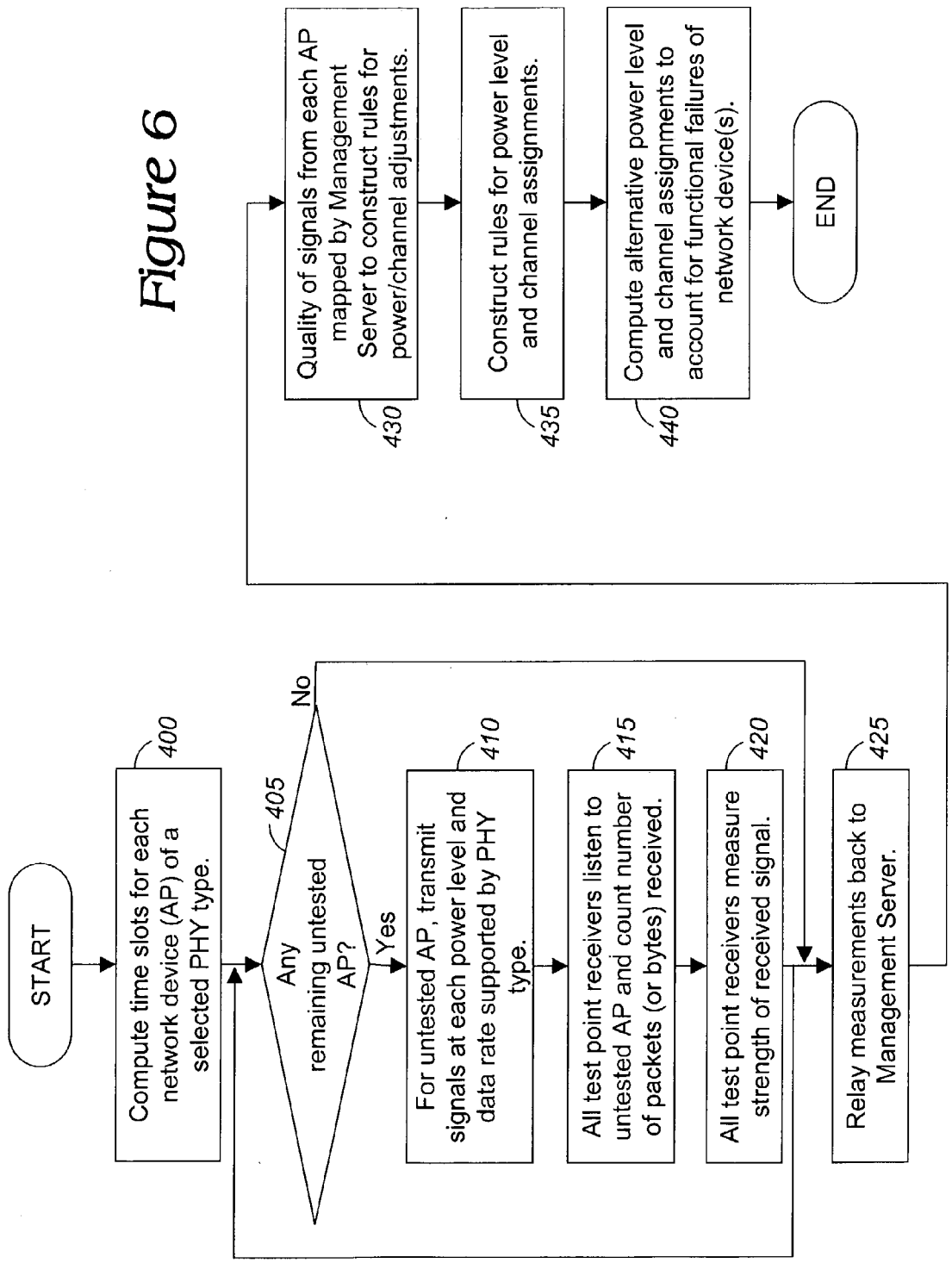
FIG. 6 is an exemplary embodiment of a calibration process based on the software modeling tool of FIG. 3.

A list of APs that will participate in this instance of the calibration process features all APs in the selected building that support the selected PHY type. According to one embodiment, as shown in FIG. 6, a time slot is computed by Management Server 125 for each AP of the selected PHY type (block 400). In particular, the total amount of time assigned to a "time slot" is equivalent to the time needed for that AP to transmit a predetermined number of data packets of a predetermined size (e.g., 256 packets with 128 bytes of data per packet) at each transmission rate and at each transmit power level supported by the AP of the selected PHY type. Additionally, extra time is added to this time slot for buffering purposes.

Upon initiation of the process, all of the APs in the selected building that support the selected PHY type are informed of the start of a calibration process and the identification of their time slot (e.g. sequence number). In one embodiment, each AP computes the duration of the time slot based on the number of packets that have to be transmitted, the number of data rates in that PHY type, the number of power levels, and the inter-packet interval. Thereafter, APs turn their transmitters OFF until the start of their time slot, which is provided by the Management Server. At the start of the transmissions in its time slot, each AP turns its transmitter ON and transmits the correct number of packets in that time slot. At the end of the time slot, each AP turns its transmitter OFF.

In each time slot, exactly one AP in this list becomes a transmitter and transmits the packets at each data rate supported by the PHY type and at each transmit power level (blocks 405 and 410). At each data rate and at each power level, all the test point receivers listen to this AP and count the number of packets that are correctly received, along with the strength of the received signal (blocks 415 and 420). Either the end of the calibration process or after each testing phase (e.g., after each power level and/or data rate adjustment, after each AP measurement, etc.), the measurements are relayed back to the Management Server 125.

Each AP is also capable of being a test point receiver. Management Server 125 indicates whether it wants all the APs to be test point receivers, in addition to being the transmitters in the calibration process. If the APs have to be test point receivers, then in all time slots other than their own, they listen to the signals from the other APs, collect statistics on the number of good packets from each AP along with the received signal strength, and relay this information back to the Management Server 125 at the end of the calibration process.

The calibration process is not restricted to positioning all the receivers at the chosen test points simultaneously. It is possible to have a single piece of equipment as a test point receiver and repeat the entire process once for each test point.

At the end of the calibration process for a selected building and a selected PHY type, Management Server 125 has calibration data that maps the quality of the radio signal from each AP as measured by the test point receivers. This data is used to construct rules that would either permit or disallow the co-existence on the same channel of subsets of one or more APs at one or more power levels (block 430).

Rules for assigning channel and power levels for each deployed network device can be developed such that the traffic requirements of the wireless network are met, while minimizing interference between network devices. A small number of network devices could be turned OFF as a result of the calibration process.

With respect to one embodiment of the calibration process, for each network device that is installed, the values chosen for at least three parameters determine the coverage areas for each network device. These parameters include, but are not limited or restricted to the following: (1) whether to turn the network device ON or OFF; (2) for network devices that have turned ON, the channel that they would operate on; and (3) for network devices that are turned ON, the transmit power level at which they should operate.

For network devices being APs operating in accordance with IEEE 802.11b, there are three available choices for a non-overlapping channel (channels 1, 6 and 11). Even though there are strictly 11 available channel choices, only three channels are non-overlapping. Hence, these are the channels that are generally used in multi-AP deployments. Other users have reported using channels 1, 4, 8, and 11 for a 4-channel plan with acceptable quality, even though these channels are not strictly non-overlapping. When operating in accordance with IEEE 802.11a, there are twelve available choices for non-overlapping channel (e.g., channels 36, 40, 44, 48, 52, 56, 60, 64, 149, 153, 157, and 161).

The results of the measurements used for positioning network devices within a wireless network will form the input to the channel and power assignment scenario as set forth in block 435 of FIG. 6. Examples of rules for channel and power assignments are described below and illustrated using mixed-integer programming. The constraints for the problem are constructed based on the feasibility of two network devices operating at certain power levels on the same channel and not overlapping at any AP. For example, if at a certain test point T4, we hear AP1 at all power levels above P3 and AP3 at all power levels above P5, then we need to construct a constraint that prevents AP1 operating at any power level above P3 and AP3 operating at any power level above P5 from operating at the same channel. Thus, the constraints for the method of AP channel and power level assignments is set forth below.

A. Notation

The following notations are used for the mixed-integer programming representation. For illustrative purposes, the network devices are represented by APs, although it is contemplated that the calibration process can be performed for any network device. "$N_{AP}$" denotes the number of APs being deployed; "$N_{ch}$" denotes the number of available channels (typically 3 for 802.11b, 8–12 for 802.11a); "$N_{pl}$" denotes the number of discrete power levels that an AP supports; and "$N_{tp}$" denotes the number of test points at which the procedure described in the previous section was executed.

B. Constraints

In this section, we will describe the method used for constructing constraints for channel and power level assignments.

1. Variables

Two types of variables are represented in the mixed-integer programming representative of rules for calibrating the channel and power levels of network devices. The variables are assigned a value of either logical "0" or "1" as described below:

X_i_0, $i\Sigma\{1, 2, \ldots N_{AP}\}$, is defined such that in any solution, if X_i_0 is set to "1", then the $i^{th}$ AP is turned OFF. If X_i_0 is set to "0", then the $i^{th}$ AP is turned ON and its power level and channel assignments are obtained from the value of another variable.

X_i_j_k, $i\Sigma\{1, 2, \ldots N_{AP}\}$, $j\Sigma\{1, 2, \ldots N_{pl}\}$, $k\Sigma\{1, 2, \ldots N_{ch}\}$ is defined such that in any solution, if X_i_j_k is set to "1", then the $i^{th}$ AP is set to operate at power level "j" and on channel "k". If the value of the variable is set to "0", then the $i^{th}$ AP does not operate at power level j and channel k. The value of the X_i_j_k variable, when it is set to "0", does not give any additional information on what the channel and power level assignments are for this AP.

2. Constraint from an AP

For every AP, a constraint is developed such that the AP is either turned OFF, or if it is turned ON, then it is assigned exactly one combination of a power level and a channel. This is achieved by the following constraint (equation 5):

$$X\_i\_0 + \sum_j \sum_k X\_i\_j\_k = 1, \forall i \in \{1, 2, \ldots N_{AP}\} \quad (5)$$

Given that all the variables in the equation above have to be either logical "0" or "1", any feasible solution would set exactly one of the variables to "1" and all others to "0".

3. Constraint from a Test Point

At each test point, we have to ensure that any APs that are reachable at this test point when using certain power levels are not assigned the same channel. For example, if at a test point "Q," the reachable APs are AP1 at power levels above 3, AP2 at power levels above 2 and AP3 at power levels above 4, then the constraint is represented as shown in equation (6):

$$\sum_{j=3}^{N_{pl}} x\_1\_j\_k + \sum_{j=2}^{N_{pl}} x\_2\_j\_k + \sum_{j=4}^{N_{pl}} x\_3\_j\_k = 1, \forall k \in \{1, 2, \ldots N_{ch}\} \quad (6)$$

Thus, there would be "$N_{ch}$" constraints per test point.

The total number of constraints is $N_{ch}*Ntp_+NAP$. Herein, as shown, there is one constraint for each AP and one constraint for each channel at each test point.

It is possible to use APs and AMs as test points such that the entire calibration process can be accomplished without requiring any hardware in addition to the deployed APs and AMs.

The constraint described for the test point is a "hard" constraint, i.e. it does not allow for any overlap at each test point whatsoever between two APs that have an acceptable level of service at that test point. In reality, to provide a contiguous coverage, it is desirable to have a certain degree of overlap between adjacent coverage areas. This constraint can then be modified into a "soft" constraint where the constraint permits overlap between adjacent coverage areas according to a user-specified overlap factor. The constraint is modified as set forth in equation (7):

$$z\_t - \sum_{j=3}^{N_{pl}} x\_1\_j\_k + \sum_{j=2}^{N_{pl}} x\_2\_j\_k + \sum_{j=4}^{N_{pl}} x\_3\_j\_k = 0, \quad (7)$$

$$\forall k \in \{1, 2, \ldots N_{ch}\} \forall t \in \{1, 2, \ldots N_{tp}\},$$

z_t≦overlap_factor (o), and

"z_t" is an auxiliary variable that indicates the number of APs that would overlap at test point t.

The sum of z_t over all test points now gives a measure of coverage provided by the APs in that building. This measure can be used as an objective function that can be maximized. Choosing an appropriate value for the overlap factor bounds the amount of interference from a pair of APs operating on the same channel. The overlap factor can also be used to achieve specific results with respect to lower interference versus higher coverage. A higher coverage requirement dictates that more APs be turned ON, but that also results in higher interference. Choosing a higher value for the overlap factor results in a solution that has better coverage at the cost of higher interference, while choosing a low value for the overlap factor does the opposite (minimizes interference, but could also result in lower coverage compared to the previous solution).

4. Objective Function

The objective function is an important part of the problem since this determines which among all feasible solutions is the best candidate for deployment. The objective function for the integer programming problem is determined by the objective that has to be met by the AP deployment problem. Some examples of objective functions are:

Overall minimal transmit power at all APs: We may want to deploy with small cells, thus increasing the capacity of the overall network. A potential candidate for this scenario is the following, presuming that the power levels are increasing (i.e.; power level $P_2$>power level $P_1$)

$$\text{minimize} \sum_{i=1}^{N_{AP}} \sum_{k=1}^{N_{ch}} \sum_{j=1}^{N_{pl}} K_j * X\_i\_j\_k, \text{ where "}K_j\text{" is a} \quad (8)$$

value that increases as "j" increases (e.g., $K_j=j$, $K_j=j^2$, $K_j=j/2$, etc.).

Turn ON as many APs as possible: a likely objective function for this scenario is the following:

$$\text{minimize} \sum_{i=1}^{N_{AP}} x\_i\_0 \quad (9)$$

C. Assignments for High Availability

It is possible to pre-compute alternate channel and power level assignments for all APs in case one of the APs that is turned ON is unable to function as expected with its channel and power level assignment as set forth in block 440 of FIG. 6. One primary reason for functional failure is equipment failure, but other less obvious reasons exist. For example, an interfering source using the same channel as the AP could lead to an unacceptable reduction in the AP's performance.

In the mathematical model described above, we could add constraints that force APs to be either turned OFF or operate at chosen channels and/or power levels. This is accomplished by forcing appropriate variables to a value of either logic "0" or "1", prior to solving the problem. For example, if we want to arrive at a set of channel and power level assignments for all the APs such that we force AP2 to be turned OFF, then add the following constraint to the power level and channel assignment rules: X_2_0=1. Or, if we wanted to force AP3 to operate on channel 3 and at power level 5, then add the following to the power level and channel assignment rules: X_3_5_3=1.

These additional constraints can be used to pre-compute power level and channel assignments assuming either failures of APs or the inability to operate with a given set of assignments. Adding these constraints provides new assignments, which can be pre-computed, stored on the Management server 125 of FIG. 1, and applied as soon as one of these events is detected.

The process described above is computationally intensive and requires solutions for a large number of problems in order to achieve high-availability assignments, especially for multi-AP failures. Also, this process does not guarantee that the changes in channel assignments between the regular assignment and the high-availability assignments are minimal.

Figure 7:
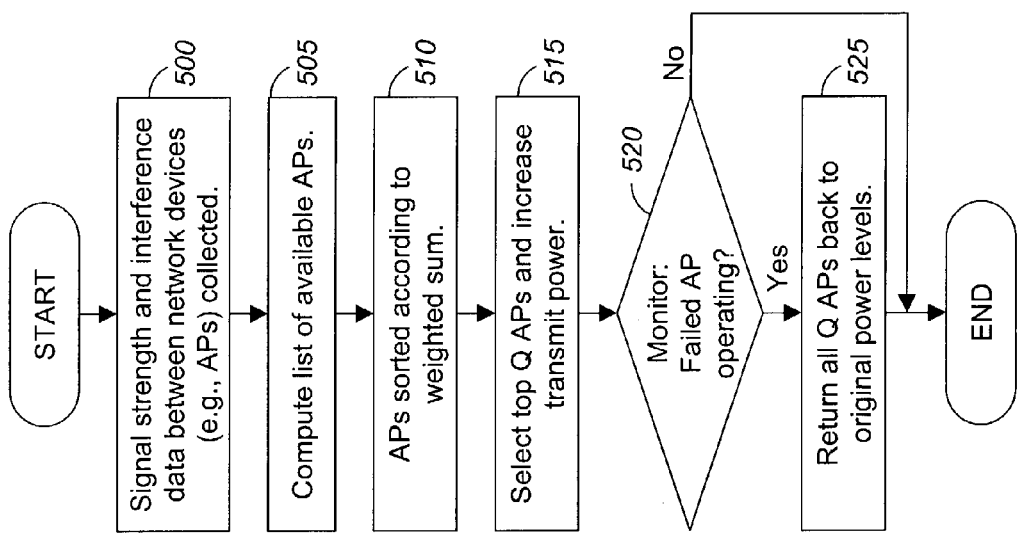
FIG. 7 is an exemplary flowchart of operations of the calibration process for adjusting power levels and channel assignments of an AP.

As shown in FIG. 7, another process to achieve higher availability assignments is to only alter only the transmit power of the APs. During the calibration process, the signal strengths and interference data between network devices (e.g. APs) is collected (block 500). This data is used to solve the modified version of the high-availability problem, for example, find a subset of APs that should increase their transmit power in order to fill the void left behind by an AP having to be turned OFF (either due to failure or other reasons).

More specifically, for each AP that has failed, the following procedure is executed to arrive at a subset of APs that should increase their transmit power. According to blocks 505 and 510, this list of APs is created and sorted according to a function that is a weighted sum of the following three variables: distance from the available AP to the failed AP, the relative signal strength measured at the available AP during the calibration process (the failed AP being the transmitting AP), and the availability of transmit power headroom (if the available AP is already transmitting at the highest power, then it has no room to increase it). The individual weights assigned to these variables can be altered as desired.

For example, if we want the APs that are nearest to the failed APs to turn ON, then that variable has a much higher relative weight than the other two. Nominally, the signal strength variable should have the highest weight since that captures the "RF proximity" of an AP to a failed one.

Once the APs are sorted according to the above function, the top Q APs are selected and their transmit power is increased (block 515). The increase may be in a uniform manner by P levels (P≧1) from their current level, or may be performed in a non-uniform manner (e.g., APs power level adjusted based on which APs are below maximum transmit power level and physical proximity to failed APs). Note that any APs that were initially turned OFF could be turned ON during the high-availability process.

When an AP that went down due to failure is operational again, then the above process is reversed to get back to the state that the network was in prior to that APs' failure (blocks 520 and 525). Hence, the power levels for the selected "Q" APs is reduced appropriately.

This procedure also handles multiple AP failure events by iteratively computing the new assignments for each failed AP.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A method comprising:
   determining locations within a site for a first plurality of network devices, comprises:
   inputting physical dimensions of the site into a software modeling tool;
   inputting a total number of users;
   inputting a desired association rate;
   computing the first plurality of network devices to deploy, the computing of the first plurality of network devices (N) to deploy is performed in accordance with an equation $N=o*s/(h*r^2)$, where
   "h" is a coefficient for an approximation of hexigon coverage, $h \leq 3$;
   "r" is a selected radius to achieve the desired association rate,
   "s" is a size of the site being covered, and
   "o" is an overlap factor determined by user to ensure smooth transition from one coverage area to another ($o \geq 1$);
   computing an initial placement of the first plurality of network devices; and
   calibrating the first plurality of network devices by each of the first plurality of network devices separately and successively transmitting wireless signals and mapping the quality of the wireless signals as measured by at least two network devices selected to be test receivers.

2. The method of claim 1, wherein the computing of the initial placement of the first plurality of network devices comprises selecting locations for a second plurality of network devices greater than the first plurality of network devices, sorting the second plurality of network devices by non-overlapping coverage, and selecting the first plurality of network devices from the sorted second plurality of network devices.

3. A method comprising:
   determining locations within a site for a plurality of access points; and
   self-calibrating the plurality of access points by (i) each of the plurality of access points successively transmitting a radio frequency (RF) signal and at least two network devices measuring the RF signals from the access points in order to detect RF interference resulting from neighboring access points being assigned the same channel and maintained at given power levels, where one of the at least two network devices being one of the plurality of access points, (ii) turning off and deactivating at least one of the plurality of access points.

4. The method of claim 3, wherein the transmitting of the RF signals by each of the plurality of access point is based on computed time slots.

5. The method of claim 3, wherein the calibration of the plurality of access points comprises adjusting an isotropic radiated power level of a first access point of the plurality of access points in response to detection of RF interference with a neighboring second access point.

6. The method of claim 5, wherein the calibration of the plurality of access points further comprises adjusting a channel of the RF signal provided by the first access point to be non-overlapping with an RF signal produced by the second access point.

7. The method of claim 3, wherein the calibration of the plurality of access points comprises adjusting a channel of the RF signal provided by a first access point of the plurality of access points to be non-overlapping with an RF signal produced by a neighboring second access point.

8. The method of claim 5, wherein the calibrating of the second access point of the plurality of access points involves turning off and deactivating the second access point.

* * * * *